May 25, 1965 W. S. MILLER 3,185,065
APPARATUS AND METHOD FOR PRINTING PHOTOGRAPHS
WITH ULTRAVIOLET LIGHT
Filed April 30, 1962
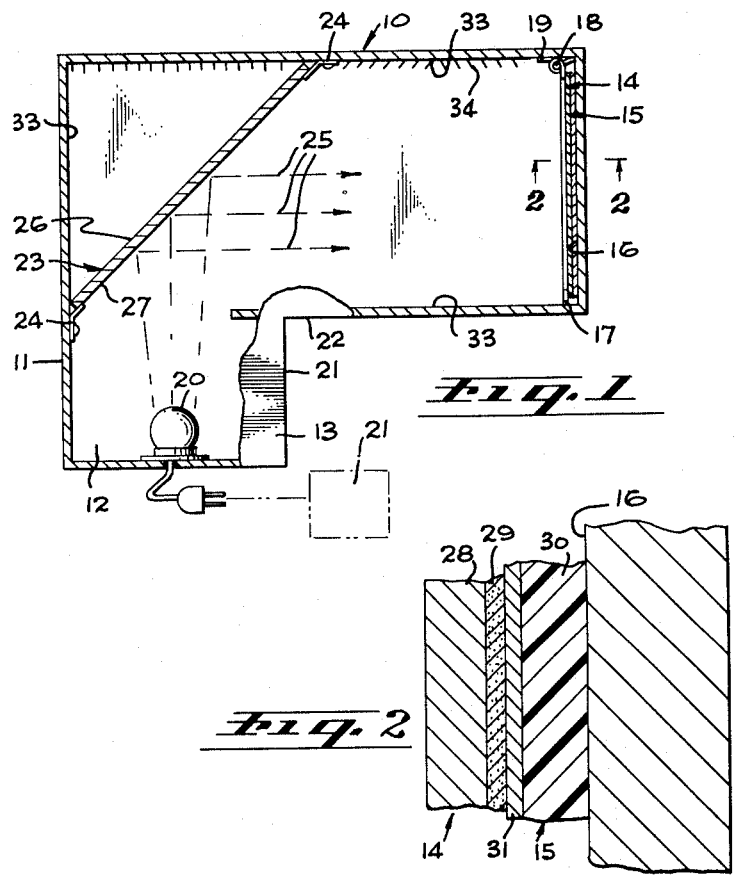
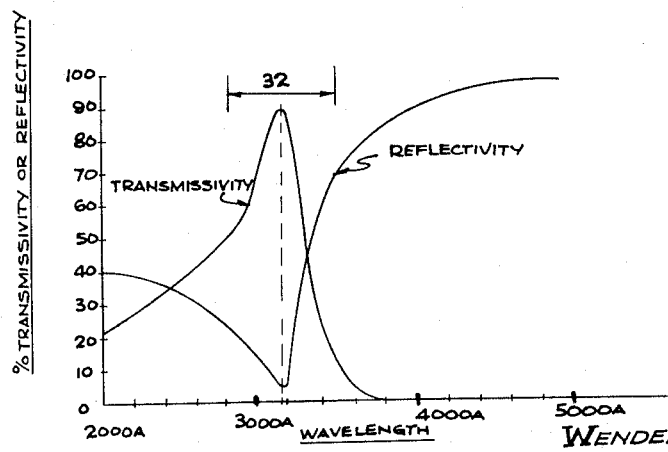
INVENTOR.
WENDELL S. MILLER
BY
ATTORNEY 3,185,065
APPARATUS AND METHOD FOR PRINTING PHOTOGRAPHS WITH ULTRAVIOLET LIGHT
Wendell S. Miller, 1341 Comstock Ave., Los Angeles, Calif.
Filed Apr. 30, 1962, Ser. No. 190,940
7 Claims. (Cl. 95—73)

This invention relates to improved apparatus and methods for printing or copying photographs by means of ultraviolet light.

Certain types of photographic film and printing paper currently in use in the photographic industry are especially sensitive to light in the ultraviolet range, and therefore are customarily printed from a negative by means of such ultraviolet light. As in the case of other photographic printing operations, the negative may be placed over the ultraviolet sensitive film or contact paper, and light within the ultraviolet range is then directed through the negative and onto the film or paper, to form an image thereon. If an enlargement is desired, the ultraviolet light may be used as the light source in an enlarger, to direct ultraviolet through the negative and onto the film or paper in the form of an enlarged image.

In prior ultraviolet printing or reproducing systems of this general type, difficulty has been encountered in obtaining adequate contrast in the ultimate print or copy. I have discovered that this lack of contrast is caused by the fact that the silver particles which form the photographic image in conventional negatives are not in fact opaque to ultraviolet energy of certain wave lengths, and consequently some of the light from an ultraviolet source may be transmitted through the portions of the negative which are intended to be dark, and thereby cause a haze or lack of contrast on the ultimate print or reproduction of the negative. More specifically, there is a portion of the ultraviolet range centered around approximately 3080 Angstroms wave length at which the reflectivity of silver for ultraviolet is much lower, and the transmissivity of silver for the ultraviolet is much higher, than at other points in the ultraviolet range.

The general object of the present invention is to provide a method and apparatus for making photographic prints or copies with ultraviolet, utilizing conventional silver type negatives, in a manner overcoming the above discussed disadvantage of conventional ultraviolet processes, and producing a final print or copy in which the contrast is not adversely affected by the above discussed factor. Specifically, this result is attained by utilizing ultraviolet light from which some or all of the energy at and near the wave length at which silver has its maximum transmissivity, within the ultraviolet range, has been selectively removed. The remaining ultraviolet light then is very effectively reflected or absorbed by the silver in the negative being reproduced, and can not penetrate through that silver to affect the printing paper or film.

The unwanted ultraviolet energy may be removed from the light from a broad band ultraviolet source by means of a suitable filter. In this connection, certain specific features of the invention reside in the employment of a unique type of filter in which a coating of silver acts to transmit or absorb the unwanted portion of the light, and to reflect the remaining portion through the negative and onto a print paper or film. Thus, the characteristic of the silver particles which causes the haze producing or contrast reducing difficulty in the negative being reproduced is itself utilized in the filter element for removing the unwanted portion of the ultraviolet light from the desired portion.

The above and other features and objects of the present invention will be better understood from the following detailed description of the typical embodiments illustrated in the accompanying drawing, in which:

FIG. 1 is a plan view of an ultraviolet printing device constructed in accordance with the invention, with the cover of the device partially broken away to reveal the interior of the unit;

FIG. 2 is a greatly enlarged fragmentary section taken on line 2—2 of FIG. 1; and FIG. 3 is a graphical representation of the reflectivity of the silver for ultraviolet light of different frequencies, and the transmissivity.

In FIG. 1 I have represented at 10 an ultraviolet printing device which may typically have a housing 11 of the illustrated essentially L-shaped horizontal cross-section. The bottom of this housing may be closed by a wall 12, while the top may be enclosed by a horizontal cover 13 which is preferably removable to allow access to the interior of the device. A negative to be reproduced or printed is mounted in the housing at 14, in front of a sheet of light sensitive photographic printing paper or film 15 onto which the image formed on negative 14 is to be printed. The negative 14 and print paper or film 15 may be held against an end wall 16 of the housing by a suitable rigid frame member 17, typically hinged at 18 to swing away from wall 16, and yieldingly urged by spring 19 into its illustrated active retaining position.

The light for exposing photographically sensitive element 15 comes from a light source 20, energized by an electrical power source 21. The light element 20 is desirably of a type adapted to produce primarily ultraviolet light, typically ranging from about 1500 Angstroms to 4000 Angstroms in wave length. Element 20 may, as an example, be a mercury-vapor quartz light of known construction.

The L-shaped configuration of housing 10 is such that the ultraviolet light from lamp 20 can not travel in a straight line directly from that lamp to the location of negative 14 and print paper or film 15, being blocked by the interposition of walls 21 and 22 between these elements and the light source. In order to reach the light sensitive element 15, ultraviolet energy from lamp 20 must be reflected by a filter element 23 disposed diagonally across a corner of the housing, and suitably secured in that position as by brackets represented at 24. Filter 23 may be positioned at a 45° angle to the engaged walls of the housing, so that light reflected by this element will travel toward the light sensitive paper or film 15 along paths such as those indicated by arrows 25 in FIG. 1.

Filter 23 may take the form of a clear transparent planar sheet of glass 26, having a coating 27 extending across its entire surface formed of silver particles distributed within a gelatinous carrier which is preferably transparent to ultraviolet light. For example, the layer 27 may be formed by coating the glass 26 with a simple silver halide photographic emulsion, such as is used in "ordinary" photographic film, then exposing this emulsion to light uniformly over its entire surface, and developing the emulsion in conventional manner to form the desired uniformly dispersed minute silver particles within layer 27.

As has been indicated previously, the negative 14 is of conventional type, consisting of a film having an emulsion on its surface in which an image is formed by silver particles distributed within the emulsion. The print paper or film 15 on which a copy of the image on negative 14 is to be formed may be any type of paper or film which is sensitive to light in the ultraviolet range. For instance, the paper or film 15 may be an "ordinary" silver halide photographic paper or film, in which silver halide is the only light sensitive element. Less effectively, the paper or film 15 may also be a diazo type, such as that known as Kalvar, and sold by Kalvar Corporation of New Orleans, Louisiana; or may be any of the known photochromics having appreciable sensitivity to ultraviolet light of less than 3400 A. In FIG. 2, the main body of film 14 is illustrated at 28, and the emulsion carried by this body is represented at 29. The sheet 15 is represented as consisting of a carrier sheet 30 having an ultraviolet sensitive coating on its surface at 31.

Referring now to FIG. 3, I have represented in that figure a graph, in which the transmissivity and reflectivity of silver for ultraviolet light are both plotted against the wave length of that light. It is noted that, in these curves, there is an abrupt dip or sharp reduction in reflectivity of the silver, and an abrupt rise in transmissivity centered around approximately 3080 Angstroms wave length. The width of dip or rise in these curves varies somewhat with the thickness of the layer of silver being considered, the dip or rise being a very sharp and narrow notch or peak for a thick film of silver, and being somewhat broader if the silver is in the form of a very thin film.

Considering now the operation of the FIG. 1 apparatus, in the light of the curves represented in FIG. 3, ultraviolet light from lamp 20, typically extending through the entire ultraviolet range of wave lengths represented in FIG. 3, passes from lamp 20 to filter element 23 and is there separated into two parts. The silver in the coating 27 on filter 26 acts to either transmit through that coating or absorb in that coating most of the ultraviolet light within a range centered around 3080 Angstroms, which transmitted or absorbed portion of the light may for example be considered as having the band width designated 32 in FIG. 3. This range 32 may typically extend from 2800 Angstroms to 3500 Angstroms. Above and beneath the wave length range 32, most of the ultraviolet light from source 20 is reflected in the general direction of lines 25 in FIG. 1, by the silver, to pass through negative 14 and affect the light sensitive surface portion of paper or film 15. Since the light reflected from element 23, being above and beneath the critical wave length range 32, is not readily transmitted through the silver particles forming the image on negative 14, but rather is reflected by or absorbed by those particles, the ultraviolet light reaching that negative can pass through only those locations on the negative at which silver particles are not present. Thus, the dark areas of the image on the negative completely shield the corresponding portions of light sensitive paper or film 15 against exposure to the ultraviolet rays, and therefore maintain very sharp contrast in the image ultimately produced on element 15. If the portion of the original ultraviolet energy within wave length range 32 of FIG. 3 were allowed to reach negative 14 and the paper or film 15, this energy would be transmitted in substantial amounts through the silver particles of negative 14, and in that way produce a haze on the ultimate image on sheet 15, and reduce the contrast of that image.

In order to maximize the discussed effect in controlling the portion of the ultraviolet light which ultimately reaches the light sensitive paper or film 15, all of the inner surfaces 33 of the various walls of housing 11, including the upper surface of bottom wall 12 and the under surface of top cover 13, may be coated with a substance which will absorb any ultraviolet energy falling on these surfaces, so that ultraviolet light within the range 32 of FIG. 3 can not be reflected by surfaces other than filter 23 toward the negative 14 and light sensitive sheet 15. Also, light traps may be provided on the walls, as at 34, either in conjunction with the non-reflective substance or separately, to further assure against unwanted reflection of light to negative 14 and sheet 15.

I claim:

1. Apparatus for making a copy on photographic material sensitive to ultraviolet of an image formed on a negative by silver particles whose transmissivity for ultraviolet is greater for wave lengths in a predetermined portion of the ultraviolet range at and near a peak transmissivity point of about 3080 Angstroms than at other wave lengths in said range, said apparatus comprising a source of ultraviolet light, means for selectively removing from said light ultraviolet in said predetermined portion of the ultraviolet range at and near 3080 Angstroms and thereby leaving ultraviolet of predominantly said other wave lengths, and means for holding said negative and photographic material at a location to pass said ultraviolet of predominantly said other wave lengths through the film and onto said photographic material.

2. Apparatus for making a copy on photographic material sensitive to ultraviolet of an image formed on a negative by silver particles whose transmissivity for ultraviolet is greater for wave lengths in a predetermined portion of the ultraviolet range at and near a peak transmissivity point of about 3080 Angstroms than at other wave lengths in said range, said apparatus comprising a source of ultraviolet light, a filter for selectively removing from said light ultraviolet in said predetermined portion of the ultraviolet range at and near 3080 Angstroms and thereby leaving ultraviolet of predominantly said other wave lengths, and means for holding said negative and photographic material at a location to pass said ultraviolet of predominantly said other wave lengths through the film and onto said photographic material.

3. Apparatus for making a copy on photographic material sensitive to ultraviolet of an image formed on a negative by silver particles whose transmissivity for ultraviolet is greater for wave lengths in a predetermined portion of the ultraviolet range at and near a peak transmissivity point of about 3080 Angstroms than at other wave lengths in said range, said apparatus comprising a source of ultraviolet light, a filter for selectively removing from said light ultraviolet in said predetermined portion of the ultraviolet range at and near 3080 Angstroms and thereby leaving ultraviolet of predominantly said other wave lengths, said filter having silver distributed thereacross acting to selectively pass through the filter light within said predetermined portion of the ultraviolet range and to selectively reflect said other ultraviolet wave lengths, and means for holding said negative and photographic material at a location to pass said ultraviolet of predominantly said other wave lengths through the film and onto said photographic material after said reflection by the filter.

4. Apparatus comprising a photographic material sensitive to ultraviolet, a negative having an image to be copied on said photographic material and formed by silver particles whose transmissivity for ultraviolet is greater for wave lengths in a predetermined portion of the ultraviolet range at and near a peak transimssivity point of about 3080 Angstroms than at other wave lengths in said range, and a light source operable to pass through said negative and onto said photographic material ultraviolet light in which the intensity in said predetermined portion of the ultraviolet range at and near 3080 Angstroms is substantially reduced as compared with said other wave lengths.

5. Apparatus comprising a photographic material sensitive to ultraviolet, a negative having an image to be copied on said photographic material and formed by silver particles whose transmissivity for ultraviolet is greater for wave lengths in a predetermined portion of the ultraviolet range at and near 3080 Angstroms than at other wave lengths in said range, and means for passing through said negative and onto said photographic material ultraviolet light which is substantially entirely composed of said other wave lengths and not of wave lengths in said predetermined portion of the ultraviolet range at and near 3080 Angstroms.

6. The method of making a photographic copy of an image formed on a negative by silver particles whose transmissivity for ultraviolet is greater for wave lengths in a predetermined portion of the ultraviolet range at and near a peak transmissivity point of about 3080 Angstroms than at other wave lengths in said range; said method including producing ultraviolet light, selectively removing from said light ultraviolet in said predetermined portion of the ultraviolet range at and near 3080 Angstroms and thereby leaving ultraviolet of predominantly said other wave lengths, and passing said ultraviolet of said other wave lengths through said negative and onto photographic material sensitive to ultraviolet.

7. The method of making a photographic copy of an image formed on a negative by silver particles whose transmissivity for ultraviolet is greater for wave lengths in a predetermined portion of the ultraviolet range at and near a peak transmissivity point of about 3080 Angstroms than at other wave lengths in said range; said method including producing ultraviolet light, directing said ultraviolet light against a filter having silver distributed thereacross, selectively passing said light within said predetermined portion of the ultraviolet range at and near 3080 Angstroms through said filter and selectively reflecting said other wave lengths from the filter by said silver thereof, and then passing said reflected ultraviolet light of said other wave lengths through said negative and onto photographic material sensitive to ultraviolet.

References Cited by the Examiner

UNITED STATES PATENTS

| | | | |
|---|---|---|---|
| 1,260,324 | 3/18 | Capstaff | 95—73 |
| 2,569,793 | 10/51 | Anderson | 95—73 |
| 2,878,388 | 3/59 | Bergson | 250—83.3 |
| 3,028,492 | 4/62 | Goerz et al. | 250—83.3 |

RALPH G. NILSON, *Primary Examiner.*